United States Patent [19]

Kim

[11] Patent Number: 5,212,561
[45] Date of Patent: May 18, 1993

[54] NOISE KILLING CIRCUIT FOR VIDEO TAPE DUPLICATING APPARATUS

[75] Inventor: Seok-jung Kim, Seoul, Rep. of Korea

[73] Assignee: SamSung Electronics Co., Ltd., Suwon, Rep. of Korea

[21] Appl. No.: 635,243

[22] Filed: Dec. 28, 1990

[30] Foreign Application Priority Data

Dec. 28, 1989 [KR] Rep. of Korea ............... 89-21389

[51] Int. Cl.[5] ........................................... H04N 5/782
[52] U.S. Cl. ................................... 358/317; 358/310; 360/13; 360/33.1
[58] Field of Search ............... 358/310, 320, 317, 337, 358/26, 335, 311, 31; 360/33.1, 13, 15, 14.1, 14.2, 14.3

[56] References Cited

U.S. PATENT DOCUMENTS

| | | |
|---|---|---|
| 4,768,710 | 8/1988 | Dunlap et al. ............... 360/15 |
| 4,858,027 | 8/1989 | Sashou et al. ............... 360/14.3 |
| 5,057,934 | 10/1991 | Yun et al. ............... 358/335 |

FOREIGN PATENT DOCUMENTS

0233992 11/1985 Japan ............... 358/317

Primary Examiner—Tommy P. Chin
Assistant Examiner—Huy Nguyen
Attorney, Agent, or Firm—Robert E. Bushnell

[57] ABSTRACT

A color noise killing circuit for video tape duplicating apparatus which is capable of eliminating the color noise during a fine copy mode comprises mode setting circuit, color signal detecting circuit, selecting circuit and transmission, controlling circuit so that the color noise killing circuit detects via color signal detecting circuit a color signal of the play back system during the fine copy mode and thereby the transmission controlling circuit controls the selecting circuit to selectively supply signals corresponding to the respective modes to the recorder system. Consequently, by supplying the recorder with only luminance signals when black and white image signals are reproduced during the fine copy mode, the circuit achieves an improvement of picture quality duplicated.

17 Claims, 3 Drawing Sheets

NOISE KILLING CIRCUIT FOR VIDEO TAPE DUPLICATING APPARATUS

BACKGROUND OF THE INVENTION

1. Field of the Invention

The present invention relates to a noise killing circuit for video tape duplicating apparatus and, more particularly, is directed to a color noise killing circuit for duplicating apparatus with capability of two mode duplication.

2. Description of the Prior Art

A video tape duplicating apparatus also known as a dubbing machine is for making a duplicate of information recorded on a video tape onto another medium of recording.

The conventional duplicating apparatus is one assembled by connecting two video tape recording and playing apparatuses to each other and, particularly, it is generally called "double deck video tape recorder" which is composed of the two apparatuses within a housing.

A video tape recorder consists of a recording system which records an image information onto a video tape and a play back system which reproduces the recorded image information on the tape.

In such a duplicating apparatus, duplicating procedure is effected by way of recording the image information reproduced from the play back system of one apparatus onto the recording system of another apparatus.

In the play back system PB shown in FIG. 1, the mixed image signal recorded on the video tape T1, in the form of intermixture of color signal and luminance signal each having been subjected to modulation, is picked up via the play back head H1, and thereafter is separated into color signal and luminance signal. (Y/C separation)

Both the separated luminance signal and color signal are to be respectively subjected to demodulation and modulation to be changed into the respective demodulation signals Yn and Cn (referred to as Y/C demodulation), and then, those are transmitted in the form of mixture to the display apparatus or the like.

The recording system receives and Y/C separates the output signals and modulates the respective separated signals and then mixes the modulated signals, so that the resultant signals are recorded onto the video tape T2 via recording head H2, thereby completing the duplicating procedure for a video tape. Such a duplicating apparatus as described above will function well by simply connecting the respective input and output terminals of two apparatuses.

The drawback of this known system resides, however, in the fact that quality deterioration of the duplicated images often occurs due to the long transmitting path through which the reproduced image signals are transmitted for the demodulation—modulation process.

To cope with the defect, a method for improving the duplicated image quality has been proposed which directly connects the respective image signals Cf and Yf, which have been Y/C separated in the play back system, to the mixer of the recording system.

When such duplicating modes are performed in a duplicating apparatus, the former will hereinafter be referred to as a normal copy mode and the latter as a fine copy mode, respectively. The deterioration of picture quality is prevented by duplicating during the fine copy mode especially for the direct repeat duplication of photographed video tapes or the tapes.

In case that the video tape of the play back systems is recorded with only black-and-white picture information, the playing back image signal is only of luminance signal and no color signal is generated therefrom.

Here, noises generated from the color signal transmitting path cause no problems, in the normal copy mode, since those are eliminated during the courses of modulation and demodulation process.

However, in the case of the fine copy mode operation, there has always arisen such a problem that the quality of the recorded pictures is degraded because the above prescribed noises are directly induced to the play back system and mixed with the recorded luminance signal to affect the properties of recording.

SUMMARY OF THE INVENTION

The present invention has been made in consideration of the aforementioned conventional problems, and particularly has as an objective to provide a noise killing circuit for the video tape duplicating apparatus capable of eliminating the color noise during a fine copy mode.

To achieve the objective of the invention, there is provided a noise killing circuit for a video tape duplicating apparatus which comprises both a play back system for reproducing image information recorded on a video tape and a recording system for recording onto another video tape the image information reproduced from the play back system, and carries out both a fine copy mode for supplying the reproduced image information in the play back system to the mixer of the recording system after the reproduced image information is separated into luminance signals and color signals, and a normal copy mode for demodulating the luminance signals and color signals after each is separated in the play back system and modulated and then mixed together in the recording system. The noise killing circuit comprises:

mode setting means for setting the fine copy mode;
color signal detecting means for detecting an input of color signals during in the fine copy mode;
selecting means for receiving the separated luminance signals and color signals of fine copy mode and the demodulated luminance signals and color signals of normal copy mode which are transmitted from the play back system and thereafter selectively outputting the same to the recording system; and
transmission controlling means for controlling operation of the selecting means according to the detecting results of the mode setting means and the color signals detecting means.

DETAILED DESCRIPTION OF THE PREFERRED EMBODIMENTS

Now, always by way of non-limitative example, a preferred embodiment of the invention will be described in greater detail with reference to the accompanying drawings.

Figure 1:
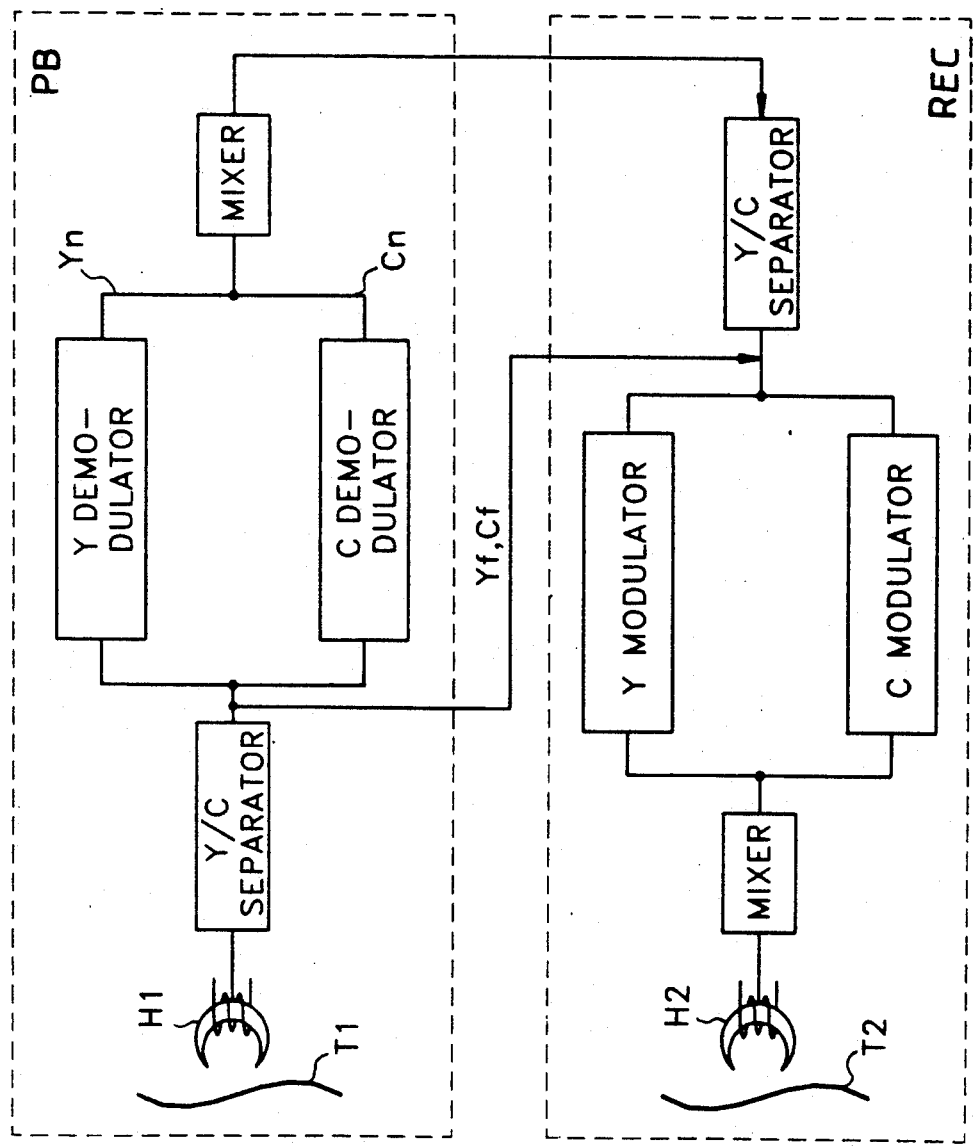
FIG. 1 is a block diagram showing the whole circuit configuration of a conventional video tape duplicating apparatus.
Figure 2:
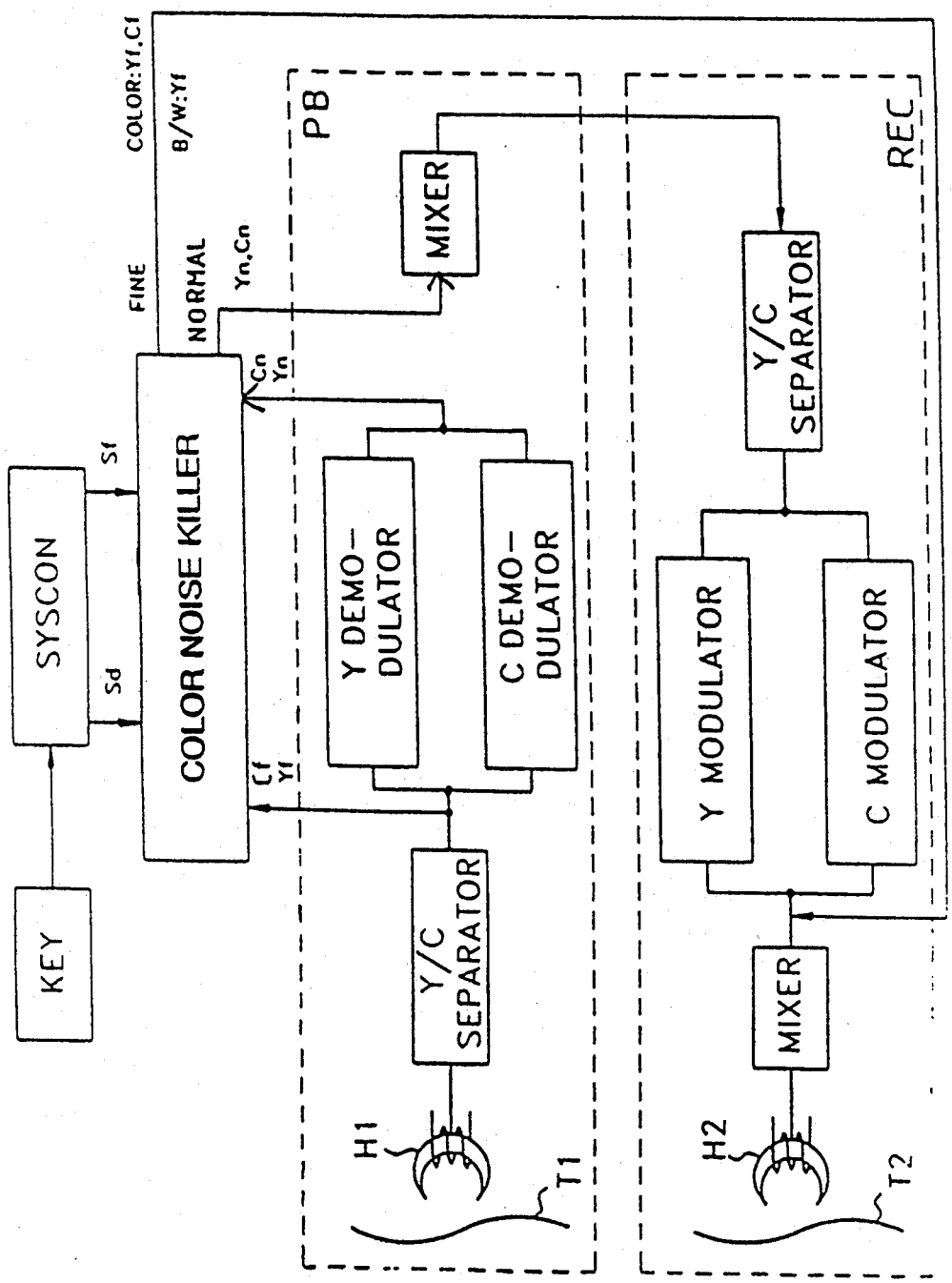
FIG. 2 is a block diagram of a duplicating apparatus embodying noise killing circuit of the present invention.

With reference to FIG. 2 wherein, the same numerals are used for designating the same parts of FIG. 1, the overlapped explanations are omitted to simplify the description.

Further, as will be used hereinafter, the Y/C separated signals of the reproduced image signals referred, for the convenience sake, to as the luminance signal Yf and the fine color signal Df; and also the Y/C separated signals having been subjected to both modulation and demodulation procedure are referred to as the normal luminance signal Yn and the normal color signal Cn, respectively.

In FIG. 2, the noise killing circuit of the present invention is selectively supplied with both the normal signals Yn and Cn and the fine signals Yf and Cf from the playing back system according to the selecting mode employed thereto, and, then processes the selected signals under control of the system controller SYSCON, and selectively transmits the same to the mixer part of the play back system PB or the receiver system REC.

The system controller SYSCON receives the user's command for duplication by means of appropriate commanding key means, and thereafter, supplies such signal as the duplicating controlling signal Sd, the fine mode designation signal Sf or the like to the noise killing circuit of this invention.

Figure 3:
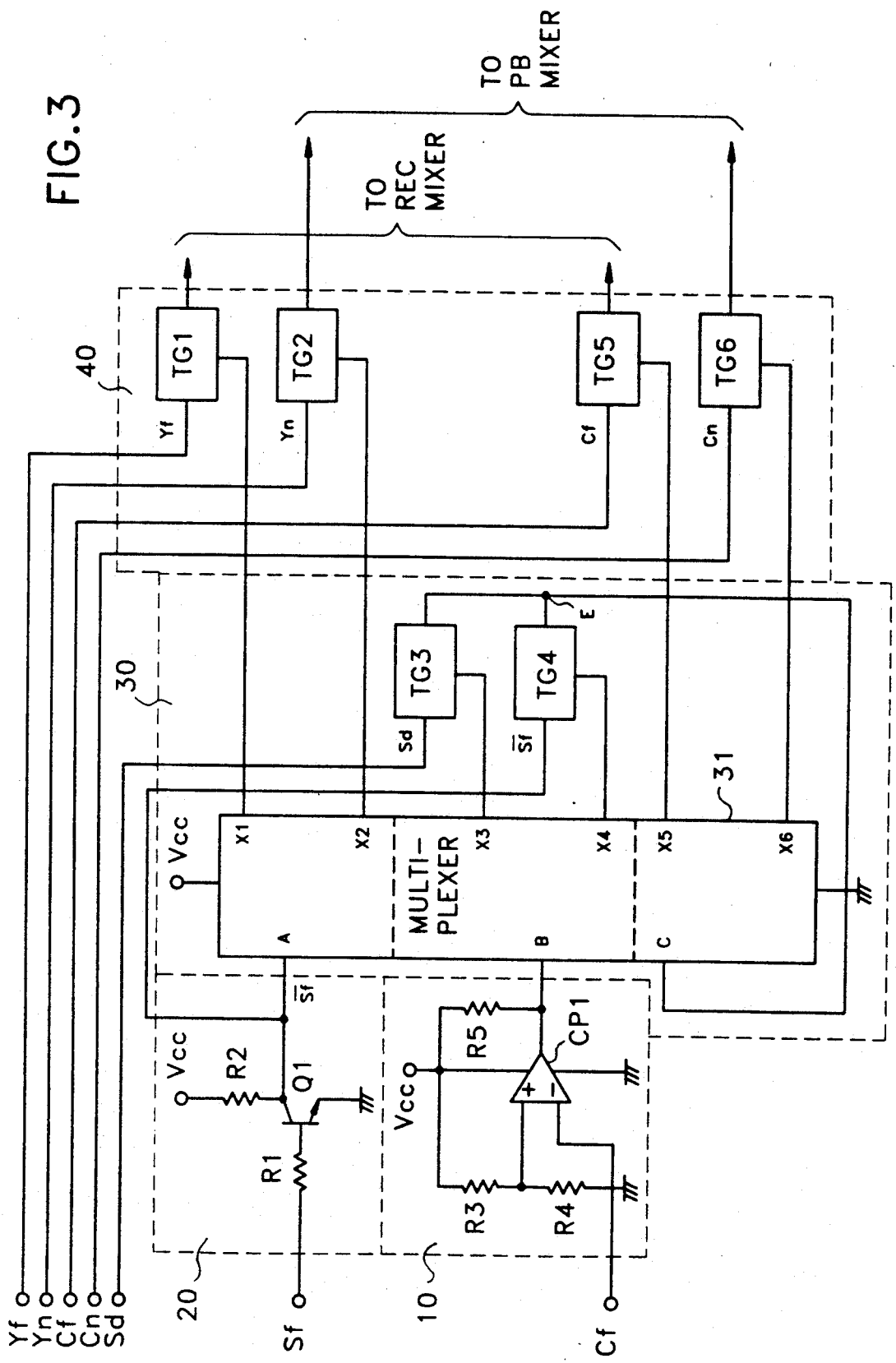
FIG. 3 is a circuit diagram of an embodiment of a noise killing circuit according to this invention.

Referring now to the FIG. 3, the noise killing circuit according to the invention is composed of the color signals detecting means 10, mode setting means 20, transmission controlling means 30 and the selecting means 40.

The color signals detecting means (10) is provided with the comparator CP1 of which reverse terminal (−) is supplied with the fine color signal Df generated from the play back system, and of which non-reverse terminal (+) connected with the registers R3, R4 and R5 is also supplied with the reference voltage.

The fine color signal Cf is applied preferably in the integrated form, according to which the comparator CP1 generates either logic level 0 if it detects the fine color signal Cf, or logic level 1 if it fails to.

To the mode setting means 20, the mode setting controlling signal Sf which is either at high level "1" during the fine copy mode or at low level "0" during the normal copy mode is input from the system controller SYSCON, and therefrom the signal Sf is directly applied to the base of emitter-grounded type transistor Q1 of which collector output terminal is connected to both the transmission controlling means 30 and the selecting means 40. Accordingly, an output signal either at low level "0" in the case of fine copy mode or at high level "1" in the case of normal copy mode is generated therefrom.

The transmission controlling means 30 includes multiplexer 31 as well as two toggle switches TG3 and TG4.

The toggle switch TG3 is fed with a duplication controlling signal Sd which is at high level "1" during the period of duplication, and another toggle switch TG4 is also fed with a fine copy designating signal Sf which have been reversed from the mode setting means 20.

A preferred type of the multiplexer 31 is of analog type having three channels and two outputs each channel. Channel A receives the reversed fine copy designating signal Sf which is an output of mode setting means 20, channel B is fed with the output of the color signal detecting means 10 to deliver logic states to the two toggles switches TG3 and TG4.

Further, the remaining channel C is also fed with the sum of the outputs of both toggle switches TG3 and TG4.

In the above configuration, the multiplexer 31 generates an output depending on the respective inputs of three channel, A,B and C by ciphering out a sum with its outputs (X1-X6), as shown on the following Table 1.

(TABLE 1)

| INPUT | OUTPUT | X1, X3, X5 | X2, X4, X6 |
|---|---|---|---|
| A, B, C | 1 | 0 | 1 |
|  | 0 | 1 | 0 |

As the controlling switch which is fed with both the color signals Cf and Cn and luminance signals Yf and Yn of the respective fine mode and normal mode, the selecting means 40 is provided with 4 toggle switches, namely TG1, TG2, TG5 and TG6.

The respective toggle switches TG1 to TG6 of the transmission controlling means 30 and the selecting means are controlled by the outputs X1-X6 of the multiplexer 31 each corresponding to the respective numerals. Each toggle switch from TG1 to TG6 is toggled at a high level "1" of the respective outputs of X1 to X6.

Here, the outputs of the multiplexer 31 for the respective mode of duplication is as shown on the following table (2).

(TABLE 2)

| MODE | INPUT/OUTPUT | A | B | C | X1 | X2 | X3 | X4 | X5 | X6 |
|---|---|---|---|---|---|---|---|---|---|---|
| Fine Copy | B/W | 0 | 0 | 1 | 1 | 0 | 1 | 0 | 0 | 1 |
|  | COLOR | 0 | 1 | 0 | 1 | 0 | 0 | 1 | 1 | 0 |
| Normal copy | B/W | 1 | 0 | 1 | 0 | 1 | 1 | 0 | 0 | 1 |
|  | COLOR | 1 | 0 | 1 | 0 | 1 | 1 | 0 | 0 | 1 |

Accordingly, the toggle switches TG1 to TG6 of the selecting means 40 are selectively caused to be operated, and thereby the outputs of the toggle switches TG1 and TG5 are then applied to the mixer part of the recorder REC in FIG. 2, and those of toggle switches, TG2 and TG6 to that of the playing back system PB, respectively.

Since the former and the later respectively corresponds to the fine copy mode and the normal copy mode, it is possible for such a conversion of signal supply, upon demanding of occasion, to provide an appropriate conversion switches controlled by the system controller SYSCON.

Descriptions are now given in greater detail with reference to FIGS. 2 and 3 and Table 2 to the operation of the four cases where black nd white signals or color signals are inputted during both the fine copy mode and the normal copy mode.

Reference is first made to the operation of the fine copy mode with black and white image input signal. In this operation of playing back only fine luminance signal Yf from the play back system in the FIG. 2, the fine copy designation signal Sf is input at high level "1", and thereby the channel A of the multiplexer 31 and the toggle switch TG4 are both supplied with a voltage at low level "0" by way of turning on the transistor Q1 of the mode setting means 20. As the above case is only for the black and white image signals, the color signal detecting means 10 generates a signal at low level "0" which eventually is applied to the channel B.

Subsequently, the output X3 of the channel B causes the toggle switch TG3 to be turned on and thereby the channel C is supplied with a signal at high level "1". Accordingly, an output of the fine color signal Cf is thereby broken following cut-off of the toggle switch TG5. At this moment, the toggle switch TG1 is immediately turned on by the output of the channel A, so that fine luminance signal Yf is thereby generated.

Consequently, when black and white image signals are input during the fine copy mode, the fine color signal Cf is interrupted, and only the fine luminance signal Yf is generated, so that color noises are blocked in consequence.

As illustrated in FIG. 2, the above fine luminance signal Yf is induced to the mixer part of the recorder REC to be recorded onto the video tape T2 via recording head H2. So, no signal is transmitted at this moment even though the toggle switch is turned on since there is not any input of normal color signal Cn.

Next, the operation of the circuit will now be explained hereinafter when color image signals are input during the fine copy mode. In this case, the output of color signal detection means 10, i.e., the input of the channel B is at high level "1", so the multiplexer 31 generates fine color signal Cf by turning on the toggle switch TG5. Therefore, both the fine luminance signal Yf and the color signal Cf are supplied to the mixer part of the recorder REC.

Meanwhile, in case that either black and white image signal or color image signal is input during the normal copy mode, the inputs of the channel A and the channel B are the same, and therefore, this makes the input of the channel C also the same as those of channels A and B.

Thus, the selecting means 40 operates in the same way.

As the fine copy designating signal Sf is set at a low level "0" during the normal copy mode, a high level "1" is input to the channel A of the multiplexer 31 to render the toggle switch TG2 turned on, and thus the normal luminance signal Yn is generated therefrom.

However, an input at a low level "0" is supplied to the channel B because no fine color signal Cf is supplied to the color signal detecting means Cf. Accordingly, the toggle switch TG3 is turned on and the duplication controlling signal Sd at a high level "1" is then supplied to the channel C, and thereby the toggle switch TG6 is turned to generates the normal color signal Cn.

Thus, under the normal copy mode operation, the normal luminance signal and the normal color signal are both generated and supplied to the mixer part of the playing back system PB illustrated in FIG. 2.

As described above, the present invention normally supplied the color image signal to the respective mixer part of the recorder REC and the playing back system PB when the signals are input during either the normal copy mode or the fine copy mode.

Further, in case that black and white image signal is input during the fine copy mode, color noises are eliminated by way of selectively supplying the luminance signals to the recorder REC shortly after detecting them.

Accordingly, this invention can provide the duplicating apparatus for video tape which remarkably improves the quality of duplicated pictures.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A video tape duplicating apparatus having a fine copy mode and a normal copy mode, said video tape duplicating apparatus comprising:
   a play back system for reproducing image signals recorded on a first video tape;
   a recorder system for recording image signals onto a second video tape; and
   color noise killing means for selectively providing the reproduced image signals from said play back system to said recorder system, said color noise killing means comprising:
   mode setting means for generating a mode selection signal indicative of a selected one of said fine copy mode and said normal copy mode,
   color signal detecting means for detecting existence of color signals in said reproduced image signals and generating a color presence signal indicative of said existence,
   selecting means for receiving said reproduced image signals from play back system as first luminance signals, first color signals, demodulated luminance signals and demodulated color signals and selectively supplying the received signals to said recorder system; and
   transmission controller means for controlling said selecting means according to said mode selection signal and said color presence signal;
   wherein in response to selection of said fine copy mode, said reproduced image signals and separated into said first luminance signals and said first color signals in said playback system and supplied to said recording system by said selecting means, and in response to selection of said normal copy mode, said play back system separates and demodulates said reproduced image signals to generate said demodulated luminance signals and said demodulated color signals received by said selecting means and thereafter supplied to said recorder system for mixing and modulation.

2. The video tape duplicating apparatus of claim 1, wherein said color signal detecting means comprises comparator means for comparing said color signals in said reproduced image signals during said fine copy mode with a reference voltage to generate said color presence signal.

3. The video tape duplicating apparatus of claim 2, further comprised of said selecting means supplying said first luminance signals and said demodulated color signals to said recorder means under control of said transmission controller means in response to said mode selection signal being indicative of said fine copy mode and said color presence signal being indicative of said color signals in said reproduced image signals being less than said reference voltage.

4. The video tape duplicating apparatus of claim 1, wherein said transmission controller means comprises multiplexer means for generating control signals received by said selecting means in response to said color presence signal and said mode selection signal.

5. The video tape duplicating apparatus of claim 1, wherein said selecting means comprises switching means for supplying said first luminance signals and said first color signals to said recorder system to be recombined for recording under control of said transmission controller means responding to said mode selection signal being indicative of said fine copy mode, and supplying said demodulated luminance signals and said demodulated color signals to said play back system under control of said transmission controller means responding to said mode selection signal being indicative of said normal copy mode, said demodulated luminance signals and said demodulated color signal being supplied to said play back system prior to transmission to said recorder system for separation into second luminance signals and second color signals for modulation and then recombination for recording.

6. The video tape duplicating apparatus of claim 5, wherein said switching means comprises a plurality of toggle switches.

7. The video tape duplicating apparatus of claim 1, wherein said color noise killing means is further comprised of:
  comparing means for performing an integration of said first color signal and comparing said integration to a threshold value; and
  said selecting means blocking said first color signals under control of said transmission controller means in response to said mode selection signal being indicative of said fine copy mode and said integration of said first color signal being less than said threshold value.

8. A video tape duplicating apparatus having a playback system, a recorder system and a color noise eliminating circuit for eliminating color noise during a fine copy mode, said video tape duplicating apparatus comprising:
  first separator means for receiving recorded image signals from a reading means and for separating said recorded image signals into first luminance signals and first color signals;
  demodulator means for demodulating said first luminance signals and said first color signals to provide demodulated luminance signals and demodulated color signals;
  first mixer means for mixing said demodulated luminance signals and said demodulated color signals to provide demodulated image signals;
  second separator means for receiving said demodulated image signals, for separating said demodulated image signals into second luminance signals and second color signals;
  modulator means for modulating said second luminance signals and said second color signals to provide modulated luminance signals and modulated color signals;
  second mixer means for mixing said modulated luminance signals with said modulated color signals or first luminance signals with said first color signals to provide recording image signals to a recording means of said recorder system;
  means for enabling selection of a recording operation being one of a normal copy mode and said fine copy mode; and
  color noise eliminator means for receiving and selectively supplying said first luminance signals and said first color signals to said second mixer means in response to the selected recording operation being said fine copy mode, and for receiving and selectively supplying said demodulated luminance signals and said demodulated color signals to said first mixer means in response to the selected recording operation being said normal copy mode.

9. The video tape duplicating apparatus of claim 8, wherein said color eliminator means comprises:
  mode setting means for providing a first intermediate signal indicative of said selected recording operation;
  color signal detecting means for detecting existence of said first color signals during said fine copy mode to provide a second intermediate signal indicative of said existence;
  selecting means for receiving and selectively supplying said first luminance signals and said first color signals to said second mixer means, and for receiving and selectively supplying said demodulated luminance signals and said demodulated color signals to said first mixer means; and
  control means for controlling said selecting means in response to said first and second intermediate signals.

10. The video tape duplicating apparatus of claim 9, wherein said color signal detecting means comprises comparator means for comparing said first color signals with a reference voltage to generate said second intermediate signal received by said control means.

11. The video tape duplicating apparatus of claim 9, wherein said control means comprises multiplexer means for receiving said first and second intermediate signals to generate control signals received by said selecting means.

12. The video tape duplicating apparatus of claim 10, further comprised of said control means controlling said selecting means to block said first color signals from said second mixer means in response to said first intermediate signal being indicative of said fine copy mode and said second intermediate signal being indicative of said first color signals being less than said reference voltage.

13. The video tape duplicating apparatus of claim 12, further comprised of said control means controlling said selecting means to provide said demodulated color signals to said first mixer means in response to said first intermediate signal being indicative of said fine copy mode and said second intermediate signal being indicative of said first color signals being less than said reference voltage.

14. The video tape duplicating apparatus of claim 10, wherein said comparator means compares said first color signals with said reference voltage by integrating said first color signals.

15. The video tape duplicating apparatus of claim 9, wherein said first luminance signals and said first color signals are provided to said second mixer means by said selecting means under control of said control means in response to said first intermediate signal being indicative of said fine copy mode and said second intermediate signal being indicative of said existence of said first color signals being detected by said color signal detecting means, and only said first luminance signals are provided to said second mixer means by said selecting means under control of said control means in response to said first intermediate signal being indicative of said fine copy mode and said second intermediate signal being indicative of said first color signal not being detected by said color signal detecting means.

16. The video tape duplicating apparatus of claim 8, further comprised of said color noise eliminator means for blocking and not providing said first color signals in response to an integration of said first color signals being less than a threshold value and the selected recording operation being said fine copy mode.

17. A method for eliminating color noise in a fine copy mode of a video tape duplicating apparatus having a playback system and a recorder system, comprising the steps of:

reading recorded image signals from a first video tape during a playback operation of said playback system and separating said recorded image signals into a first luminance signal and a first color signal;

demodulating said first luminance signal and said first color signal to provide a demodulated luminance signal and a demodulated color signal in response to selection of a normal copy mode;

recombining said demodulated luminance signal and said demodulated color signal to provide demodulated image signals in response to selection of said normal copy mode;

separating said demodulated image signals into a second luminance signal and a second color signal in response to selection of said normal copy mode;

modulating said second luminance signal and said second color signal to provide a modulated luminance signal and a modulated color signal in response to selection of said normal copy mode; and generating modulated image signals to be recorded in a second video tape during a recording operation of said recorder system by one of recombining said modulated luminance signal with said modulated color signal in response to selection of said normal copy mode and recombining said first luminance signal with said first color signal in response to selection of said fine copy mode.

* * * * *

UNITED STATES PATENT AND TRADEMARK OFFICE
CERTIFICATE OF CORRECTION

PATENT NO. : 5,212,561
DATED : 18 May, 1993
INVENTOR(S) : Seok-Jung Kim

It is certified that error appears in the above-indentified patent and that said Letters Patent is hereby corrected as shown below:

Column 1    Line 15, after "is" insert --used--;

Column 3    Line 8, before "referred" insert --are--;

Column 3    Line 10, change "Df" to --Cf--:

Signed and Sealed this

Fourth Day of March, 1997

Attest:

BRUCE LEHMAN

Attesting Officer            Commissioner of Patents and Trademarks